United States Patent [19]

Bachmann

[11] Patent Number: 5,186,205

[45] Date of Patent: Feb. 16, 1993

[54] VALVES FOR USE IN CONTROLLING THE FLOW OF A GAS STREAM THROUGH DUCTS OF LARGE CROSS SECTIONAL AREAS

[75] Inventor: Lothar Bachmann, Auburn, Me.

[73] Assignee: Bachmann Industries, Inc., Lewiston, Me.

[21] Appl. No.: 693,146

[22] Filed: Apr. 29, 1991

[51] Int. Cl.$^5$ .............................................. F16K 1/16
[52] U.S. Cl. .............................. 137/242; 137/614.18; 137/875
[58] Field of Search ........... 137/240, 242, 243, 614.18, 137/875; 251/177, 210

[56] References Cited

U.S. PATENT DOCUMENTS

| | | | |
|---|---|---|---|
| 4,003,394 | 1/1977 | Adams | 137/240 X |
| 4,254,792 | 3/1981 | Schadel | 137/240 |
| 4,493,311 | 1/1985 | Bachmann | 126/285 A |
| 4,785,844 | 11/1988 | Pahov | 137/242 |
| 4,821,507 | 4/1989 | Bachmann | 60/39.182 |
| 4,823,836 | 4/1989 | Bachmann | 137/601 |

FOREIGN PATENT DOCUMENTS 3318202 11/1984 Fed. Rep. of Germany .
3543508 11/1986 Fed. Rep. of Germany .
3504443  3/1987 Fed. Rep. of Germany .
2060824  5/1981 United Kingdom .

*Primary Examiner*—John C. Fox
*Attorney, Agent, or Firm*—Abbott Spear

[57] ABSTRACT

Valves of the diverter and isolating types have their ports which are to be opened and closed surrounded by seats each of which is inclined inwardly towards the surrounded port. The hinged blades are surrounded by tips in support of seals of which there are two for each port to be closed. The seals are metallic and resiliently flexible and the seals of each pair are disposed to engage spaced apart, transverse zones of a seat when a blade is operatively positioned to close the surrounded port. As a diverter valve has two ports to be closed by opposite sides of its blade, there are two like but oppositely disposed pairs of seals, one pair for each port. With both types of valves, the seals of a blade are in substantially linear engagement with a seat when the blade is positioned to close the associated port and are in scraping engagement with the seat as the blade moves into and out of that position. In preferred embodiments, each seal and a wing are angled away from the blade tip to which they are attached and towards the port to be sealed. Each seal is held tensioned by the associated wing until the seat is engaged to cause its flexing and the wing is operable to scrape seat encrustments without engaging the seat.

12 Claims, 8 Drawing Sheets

VALVES FOR USE IN CONTROLLING THE FLOW OF A GAS STREAM THROUGH DUCTS OF LARGE CROSS SECTIONAL AREAS

BACKGROUND OF THE INVENTION

The volumes of exhaust gas from such sources as paper mills and power plants require not only ducts of large cross sectional areas to convey the gases to stacks but also equipment in a section thereof by which the gases are conditioned or treated before being discharged.

As the equipment within such a section may need servicing, repair or replacement or additional equipment may have to be incorporated in that section, it is necessary to enable workmen to enter that section without exposure to the gases and at the same time, make it unnecessary to shut down the operation at the plant which produces the gases. Each such duct system is accordingly provided with a duct section bypassing the section in which the equipment is located and may itself be provided with duplicate equipment. Such duct systems include means to isolate either section when not in use, from the other section.

While guillotine dampers are used for isolating each section, valves of the diverter and isolator types have certain advantages over guillotine dampers as such a damper requires that the blade in the open position, protrudes outside the duct and then be stored in a bonnet or provided with additional seals at the throat where the blade of the damper exists from the duct. Valves which can be moved between positions by toggle joints are also advantageous because the valves may be quickly shifted from one position to another.

A diverter valve, see U.S. Pat. No. 4,821,507, includes a body incorporated between an upstream section and the downstream section containing the equipment. The body has aligned inlet ports and an additional port disposed at a right angle to the flow path between the aligned ports. A blade within the diverter body is connected thereto to swing between two operative positions, in one of which flow through the aligned ports is permitted and the additional port is closed and in the other operative position flow is only permitted through the other aligned port and the additional port. Such diverter valves and the seats surrounding the outlet port or ports are marginally sealed by means which, in the above referred to patent are flexibly resilient leaf springs which are shown as in accordance with U.S. Pat. No. 4,823,836 and which are disposed to seal the margins of the blade whenever it is operatively positioned.

An isolating valve includes a body which is essentially a frame dimensioned to be incorporated between duct sections and establish a flow path between the sections and bordered by a seat. A blade is pivotally connected to one side of the frame to swing between an operative position blocking the flow path and an inoperative position at one side thereof. In the operative blade position, leakage about the margins of the blade is prevented by sealing means.

The effective sealing of the blades of either diverter valves or isolating valves presents problems since, with either type, the ducts are of a large cross sectional area with a duct twenty by thirty feet being typical. The ports and valve seats are accordingly so large that the surfaces of the seat are likely to have areas which in fact are slightly uneven and constitute potential leakage paths thus making the use of sealing air a necessity.

In the above referred to U.S. Pat. No. 4,821,507, the seats of a diverter valve are shown as provided with surrounding, spaced apart seals which are engaged by appropriately spaced and dimensioned seats surrounding the blade, to provide, when the blade is operatively seated, a passage about the blade for sealing air by which exhaust gas leakage is prevented with a volume of sealing air such that air will be forced outwardly through any such leakage path.

Leaf spring seals, as presently employed, are initially effective particularly when an adequate volume of sealing air is also used. Such seals, when used prior to the present invention, become less effective in use with a leading cause that the seals and seats are brought, in use, in face to face contact with sealing pressures applied directly against them. Additional causes of ineffective sealing are associated with either blade or seat encrustments or both developing during use.

SUMMARY OF THE INVENTION

According to the invention, such valves as diverters and isolating valves are provided with seats and seals of increased effectiveness in sealing the margins of operatively positioned blades.

This objective is attained by providing each outlet port with a seat the surfaces of which are inclined inwardly towards the port and by providing the margins of the blade with at least one resiliently flexible metallic seal supported in a manner such that the free edges of the seal engage and scrape the seat as the blade swings into and out of its operative position and in its operative position, the free edges of the seal or seals are in substantially linear contact with the seat.

A blade for an isolating valve is provided with first and second resiliently yieldable metallic seals with the first seal protruding outwardly beyond the free edge of the second seal so that when the blade is operatively positioned, the two seals engage spaced apart transverse zones of the seat with the second seal proximate to the port and the first seal remote therefrom. In practise, the blade is provided with first and second tips to which the first and second seals are attached with the first tip protruding beyond the second tip to enable both seals to be of the same width.

A diverter has two ports to be closed in the alternative and each is surrounded by a seat the surfaces of which are inclined inwardly toward the associated port. When either one of the two ports is open, the other is closed and gas flow between the open port and a third port is permitted. The blade of a diverter valve differs from that of an isolating valve in that it has first, second and third tips with the first tip between and spaced from the second and third tips and protrudes beyond their free edges. Resiliently flexible metallic seals are attached to both sides of the first tip and a like seal is secured to each of the second and third tips with the seal on one side of the first tip and the seal on the second tip for sealing one of the two ports and the seals on the opposite side of the first tip and on the third tip for use in sealing the other one of those ports. When the blade is in its operative position relative to either one of the two ports, the free edges of the seals at one side of the first tip engage spaced, transverse zones of the appropriate one of the seats with the free edges of the seals in scraping engagement with the seat as the blade is swung into and out of the operative positions.

It is preferred that each resiliently flexible metallic seal be a component of a leaf spring seal unit in accordance with U.S. Pat. No. 4,823,836 with the resiliently flexible metallic seal preformed with one end secured to a face of a blade tip and its other end angled away therefrom. The seal may be and usually is backed by a similarly preformed but narrower resiliently flexible metallic leaf spring. In accordance with the invention, added to the unit is a wing angled away from the tip to be engaged by and hold the seal tensioned until its edge engages the seat. Preferably the wing is dimensioned to scrape encrustments from the seat without contact therewith.

As was noted earlier, sealing air is usually used with metallic seals and it will be noted that the blade tips define channels of substantial cross sectional area which become closed when a blade is operatively positioned. Sealing air can then be admitted to the channel through a port in the seat.

Another feature of the invention is the provision or means to flush a seat and the seal in contact therewith to remove encrustations which were dislodged by the scraping action of the seals.

Yet another feature of the invention is that a duct may be divided by the use of plural side by side isolating valves.

These and other features, advantages and objectives of the invention will be apparent from the following description of presently preferred embodiments and the claims.

BRIEF DESCRIPTION OF THE DRAWINGS

The accompanying drawings illustrate presently preferred embodiments of the invention

DETAILED DESCRIPTION OF THE DRAWINGS

FIGS. 1-5 illustrate a diverter valve to be incorporated between sections of a duct conveying exhaust gases to a stack. The duct sections are conventional and accordingly are not shown. Typically they are rectangular and large in cross section requiring similarly dimensioned diverter ports.

Figure 1:
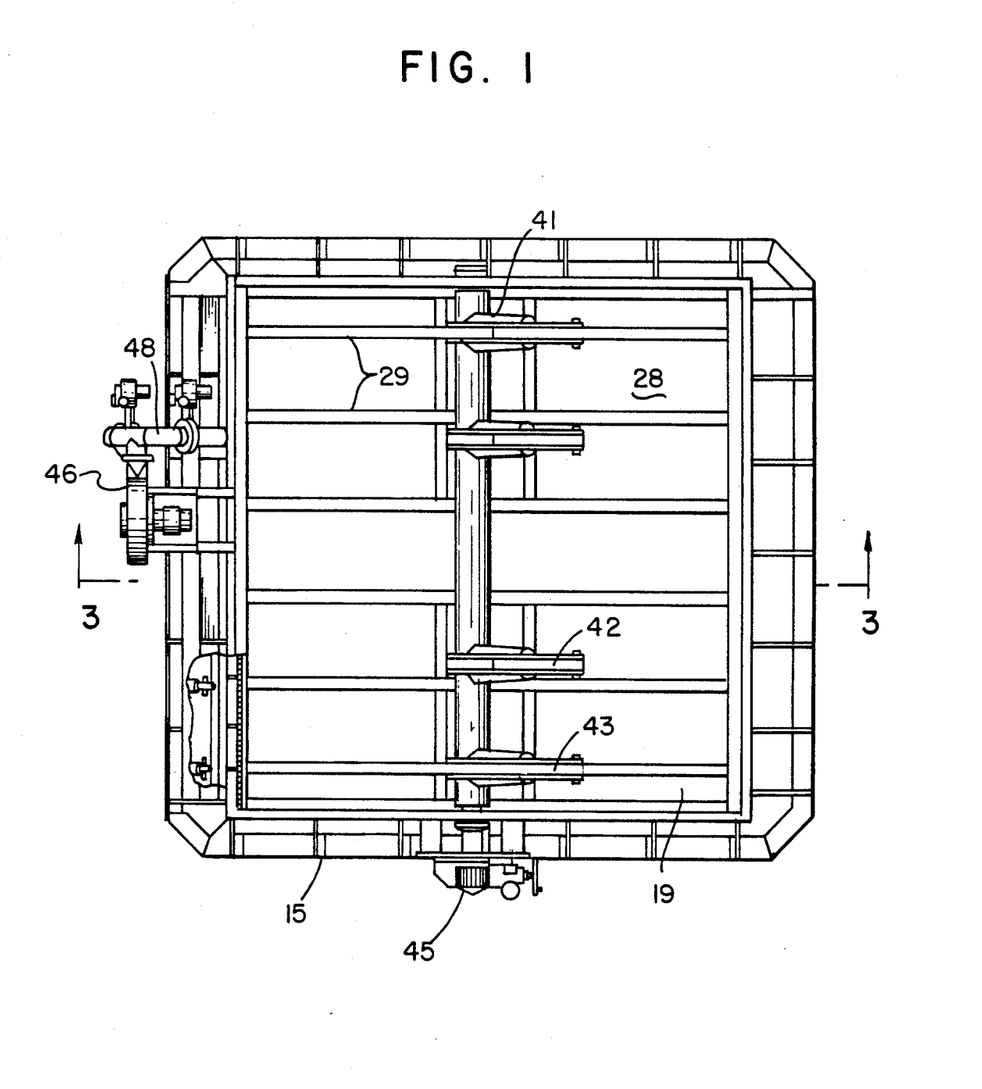
FIG. 1 is a top plan view of a diverter in accordance therewith.
Figure 2:
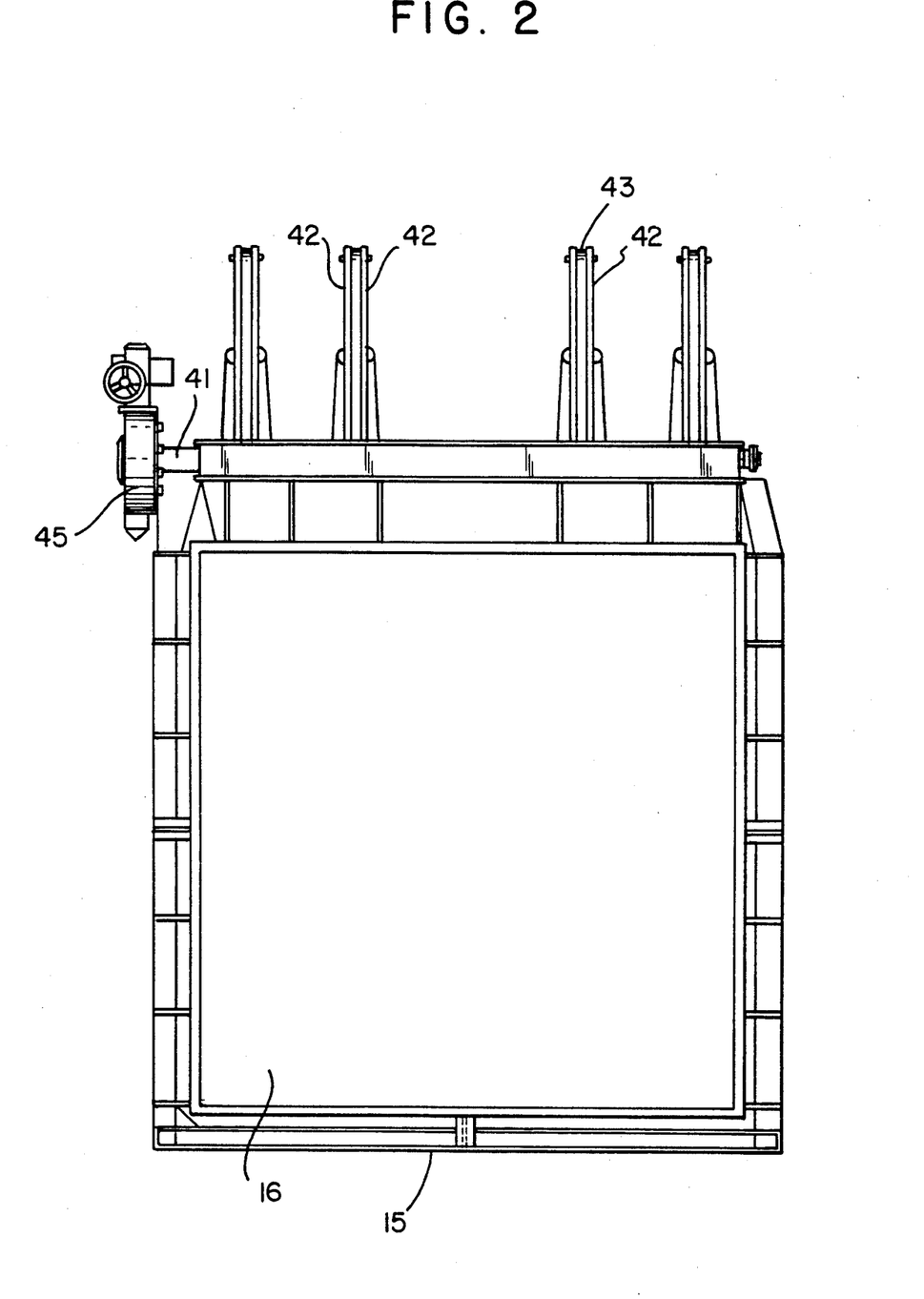
FIG. 2 is an end view thereof.
Figure 3:
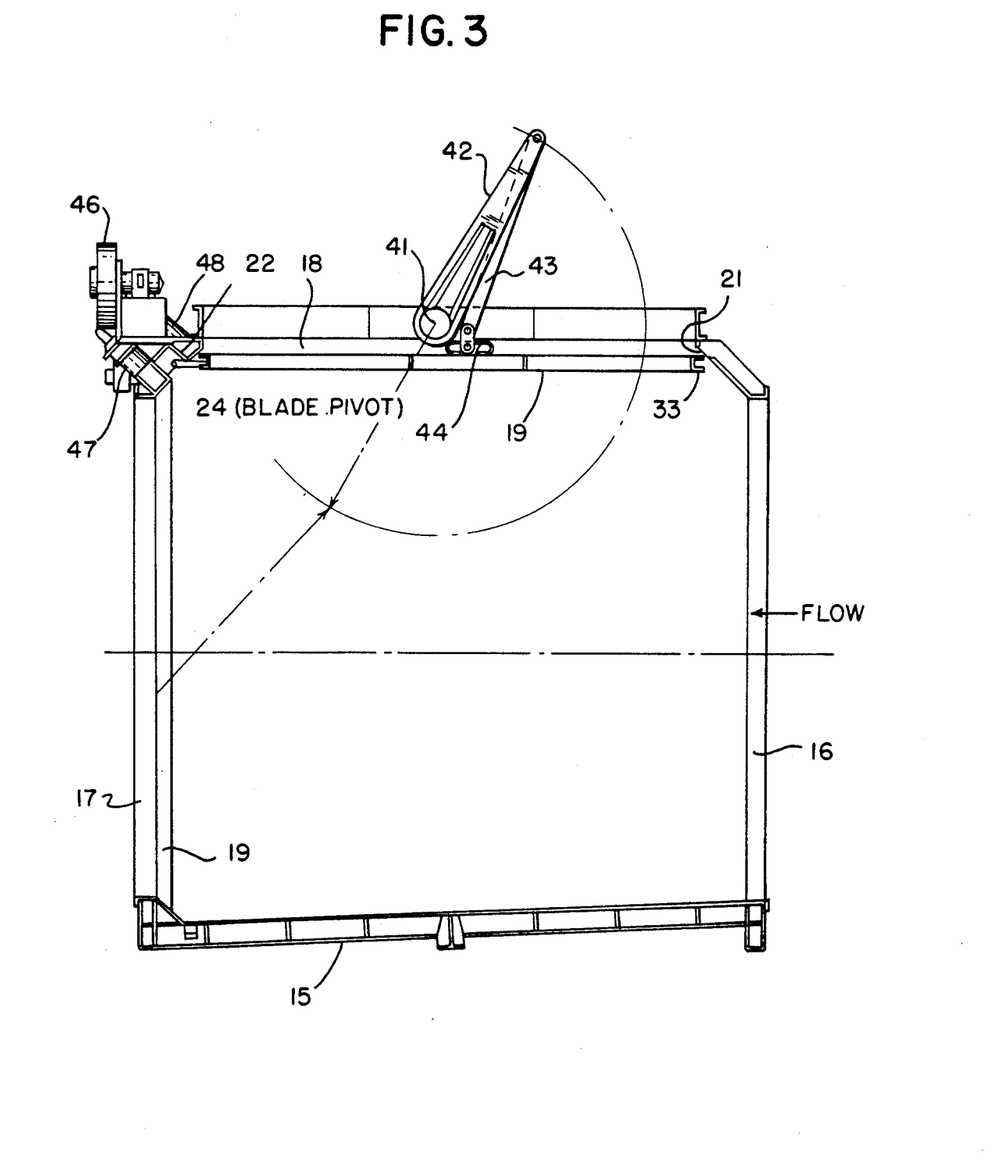
FIG. 3 is a section taken approximately along the indicated line 3—3 of FIG. 1.

The diverter valve is shown as having a body generally indicated at 15 and having aligned inlet and outlet ports 16 and 17, respectively, and a second outlet port 18 which is in a plane at right angles to the ports 16 and 17. The port 18 is shown as closed by a rectangular blade, generally indicated at 19. The outlet ports 17 and 18 are surrounded by seats 20 and 21, respectively, with their surfaces inclined inwardly towards the associated port.

The valve body 15 is provided with a U-shaped channel 22 located between adjacent sides of the seats 20 and 21 and extending lengthwise thereof. The channel 22 opens inwardly and has spaced supports 23 for the blade pivot 24. The channel 22 and the adjacent sides of the seats 20 and 21 define outwardly opening pockets 25 and 26.

The blade 19 consists of a frame 27 supporting a membrane 28 and reenforcements 29 therefor. The frame 27 has laterally extending parallel tips, a central tip 30, sometimes referred to as the first tip and side tips 31 and 32 sometimes called the second and third tips, respectively and which are equally spaced from the first blade tip 30, one side of which is connected to the pivot 24.

Each of the blade tips 31 and 32 has a sealing unit, generally indicated at 33 attached to the side thereof which will be proximate to an outlet port when the blade 19 is positioned operatively with respect thereto and like sealing units 33 are attached to both sides of the first tip 30.

Figure 4:
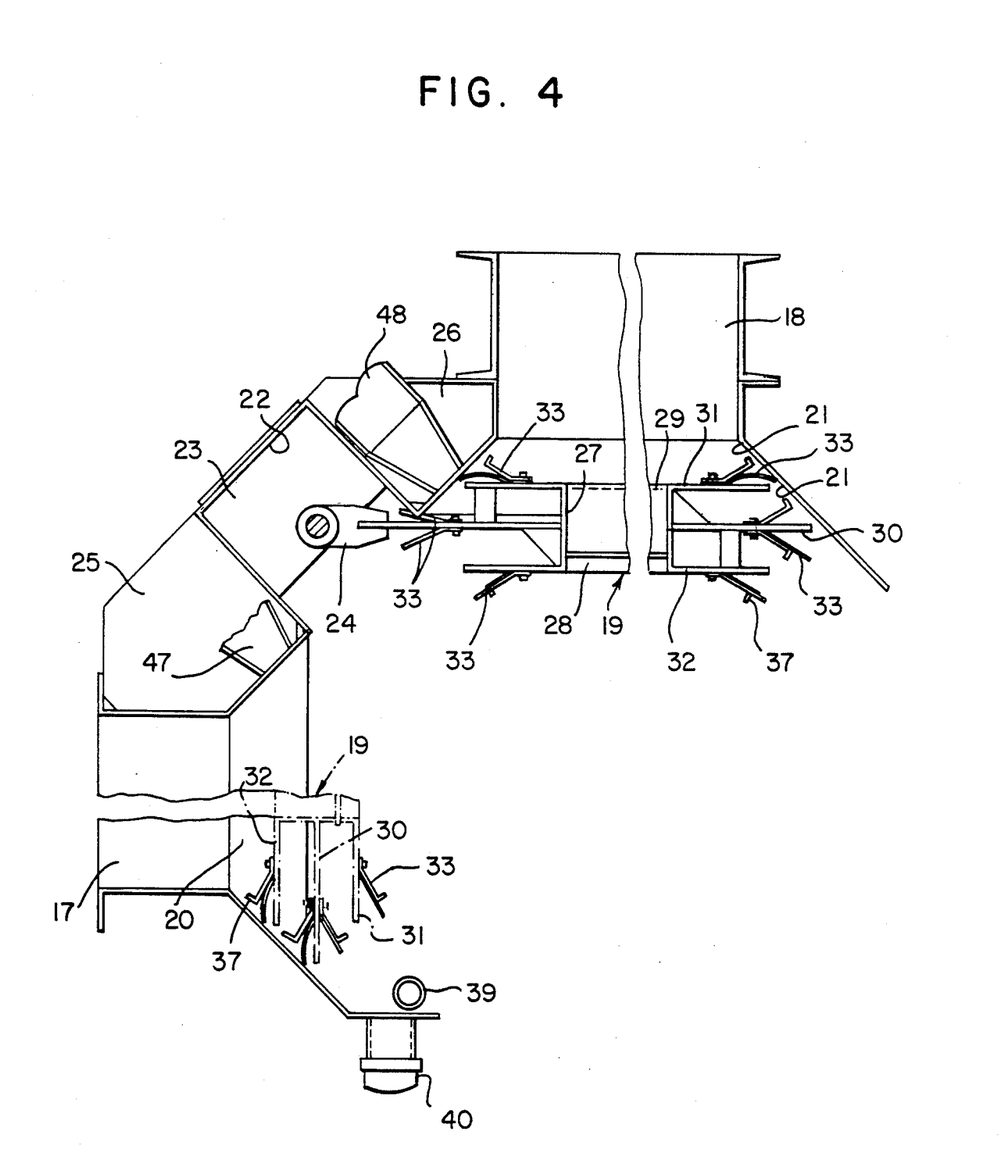
FIG. 4 is a somewhat schematic cross sectional view, on a substantial increase in scale, illustrating the blade and its seals approaching its operative position and with the blade shown in broken lines in its operative position relative to the other port to be closed with its seals appropriately flexed.
Figure 5:
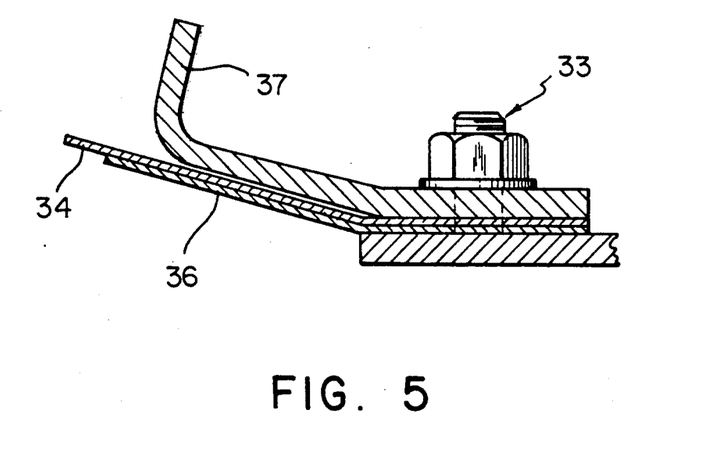
FIG. 5 is a view of a sealing unit on a substantial increase in scale.

Each sealing unit 33, see FIGS. 4 and 5, has a resiliently yieldable metallic seal 34 having an end portion 35 angled away from and extending beyond the blade tip to which it and, usually, a narrower, similarly formed leaf spring 36 which backs the seal 34 are bolted along with a wing 37. The wing 37 is angled away from that blade tip and against which the free end portions of the seal 34 and the backing leaf spring 36 are resiliently held tensioned.

In FIG. 4, the blade 19 is in its operative position relative to the blade seat 21 with the seals 34 and backing leaf springs 36 on the blade tips 30 and 31 flexed and the free edges 35 of the seals 34 in substantially linear contact with the seat 21 in spaced apart transverse zones. The free ends 38 of the wings 37 are in positions to scrape thick seat encrustments but do not come in contact with the seat. When the blade 19 is unseated, the seals 34 remain in scraping contact with the seat until they lose contact therewith, then to return to their original positions in which they are held tensioned by the wings 37. When the blade 19 closes the port 17, the sealing means attached to the blade tips 30 and 32 function in the the same manner as the blade is moved into and out of its operative position.

Due to the scraping action of the seal 34 and also that of the wing 37, substantial transverse zones of the seat 20 are freed of encrustations and in many installations, the seats and seals should be flushed to clean the seat or seats. To that end, see FIGS. 1 and 4, a spray bar 39 within the body 15 extends lengthwise of the seat to be flushed and is connected to a valve controlled water source, not shown. The floor of the body 15 is provided with a normally closed drain 40.

In order to swing the blade 19 between operative positions relative to the ports 17 and 18, a shaft 41 is journalled in the walls of the port 18 and extends transversely of the port 18 at one side of but close to the transverse center line thereof. The shaft 41 has drive arms 42 fixed thereon which are pivotally connected to toggle links 43 pivotally connected to a thermal compensator, generally indicated at 44, attached to the blade 19 on the other side of but close to the center line of the port 18. The reversible drive for the shaft is conventional and is generally indicated at 45.

The disclosed diverter has the mechanical sealing of the blade 19 supplemented by sealing air delivered from a blower 46 into the selected one of the valve controlled conduits 47 and 48 opening through the proximate sides of the seats 20 and 21, respectively, when the blade 19 has closed the port 21, air is discharged through the conduit 48 and into the deep channel defined by the blade tips 30 and 31 and their sealing units 33. Then the blade 19 is positioned to close the port 17, sealing air is delivered into its similar channel by the conduit 47.

The isolating valve unit illustrated by FIGS. 6–10 has a rectangular frame adapted to be incorporated in an oblong duct, not shown and divided by vertical partitions to establish a series of ports. As the number of ports depends on installation requirements, only an end portion of a frame 55 is shown with vertical partitions 56 and 57 establishing rectangular ports 58, 59 and 60. Only a portion of the port 60 is shown as, typically, all ports of a unit have the same dimensions. The partition 56 has an air chamber 61 and there is a partition 57 between each two partitions 56 throughout the length of the unit. Each port is surrounded by a seat 62 having its surfaces inclined inwardly towards the port which it surrounds. The direction in which the gas streams flow through the ports is indicated by the arrow in FIG. 2. Reference is made to my copending application filed on even date with this application entitled Isolating Valve Units, Ser. No. 692,543.

A pivot 63 is supported by the frame 55 directly in back of the downstream end of the partition 56. Blades 64 are provided for the ports 58 and 59 and these are generally similar to the blades 19 of the diverter valves but are for use in closing but one port. Each blade 64 is connected to the pivot 63 by arms 65 and 66 on their downstream faces. Like the blades 19, each blade 64 has a frame 67 in support of a membrane 68 and is provided with reenforcements 69 therefor. The blade frame 67 includes spaced apart, first and second tips 70 and 71, respectively, with the first tip 70 protruding beyond the second tip 71. Each of the blade tips has a sealing unit, generally indicated at 133 secured to the side thereof facing the appropriate one of the ports 58, 59 when a blade 63 is in its operative, port closing position. The sealing units 133 are substantially identical to the sealing units 33, see FIG. 5, and thus have a resiliently flexible metallic seal 134 having an end portion 135 extending beyond the blade tip to which the unit 133 is attached and angled away therefrom and shown as backed by a similarly shaped but narrower leaf spring 136. Each unit 133 also has a wing 137 angled away from that tip but at a lesser angle than the end portion 135 of the seal 134 and the backing leaf spring 136 thus to be engaged thereby and it and the leaf spring 136 held tensioned.

Figure 8:
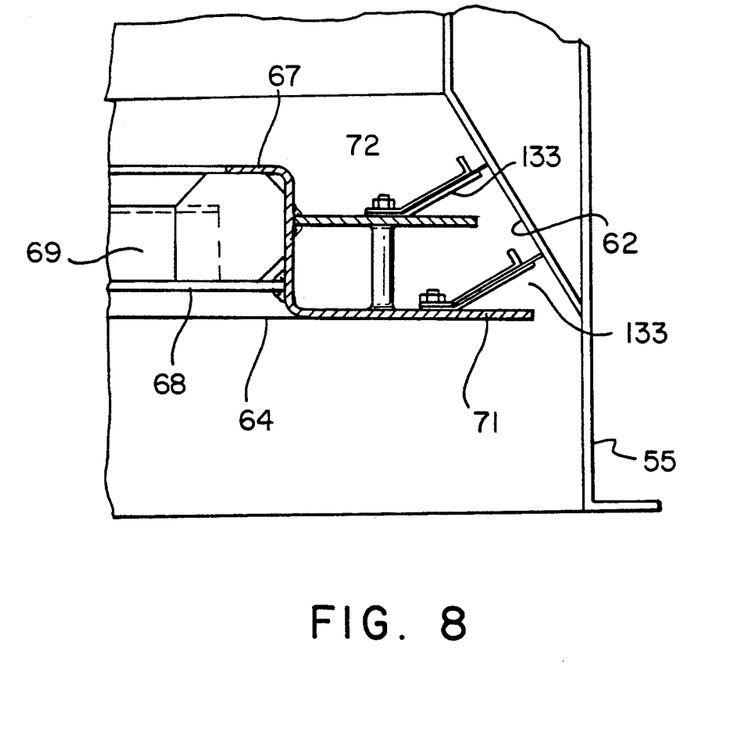
FIG. 8 is a fragmentary section on a substantial increase in scale, illustrating the position of the seals as a blade nears its operative position relative to a port.
Figure 9:
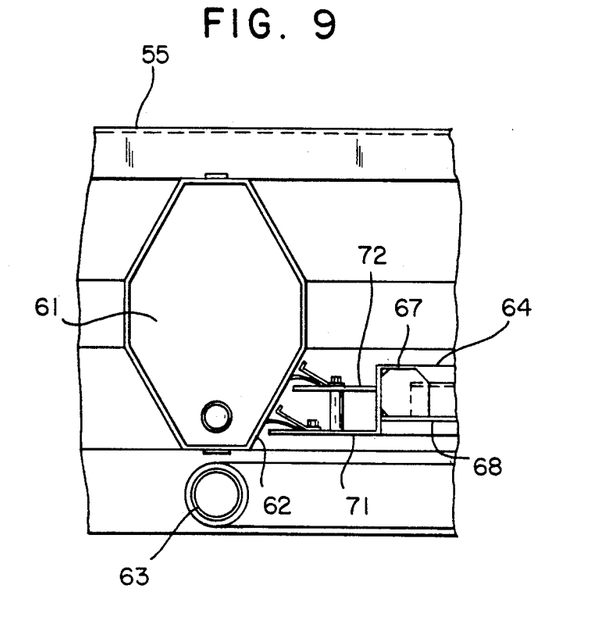
FIG. 9 is a like view illustrating the operative position of the blade and the then flexed seals.

As a blade 63 swings towards its port closing position, the end portions 135 of both units 133 engage the seat 62 surrounding that port and are flexed out of contact with their associated wing 137 and into scraping contact with spaced apart, transverse zones of the seats. When the blades are in their port closing positions, the edges of the seal portions 135 are in substantially linear contact with the seats with the zone engaged by the seal portions 135 of the blade tip 71 proximate to the associated port and the seal portions 135 of the blade tip 70 remote with respect to that port. The wings 137 are dimensioned to engage and scrape the thicker encrustments without contacting the seats.

Figure 6:
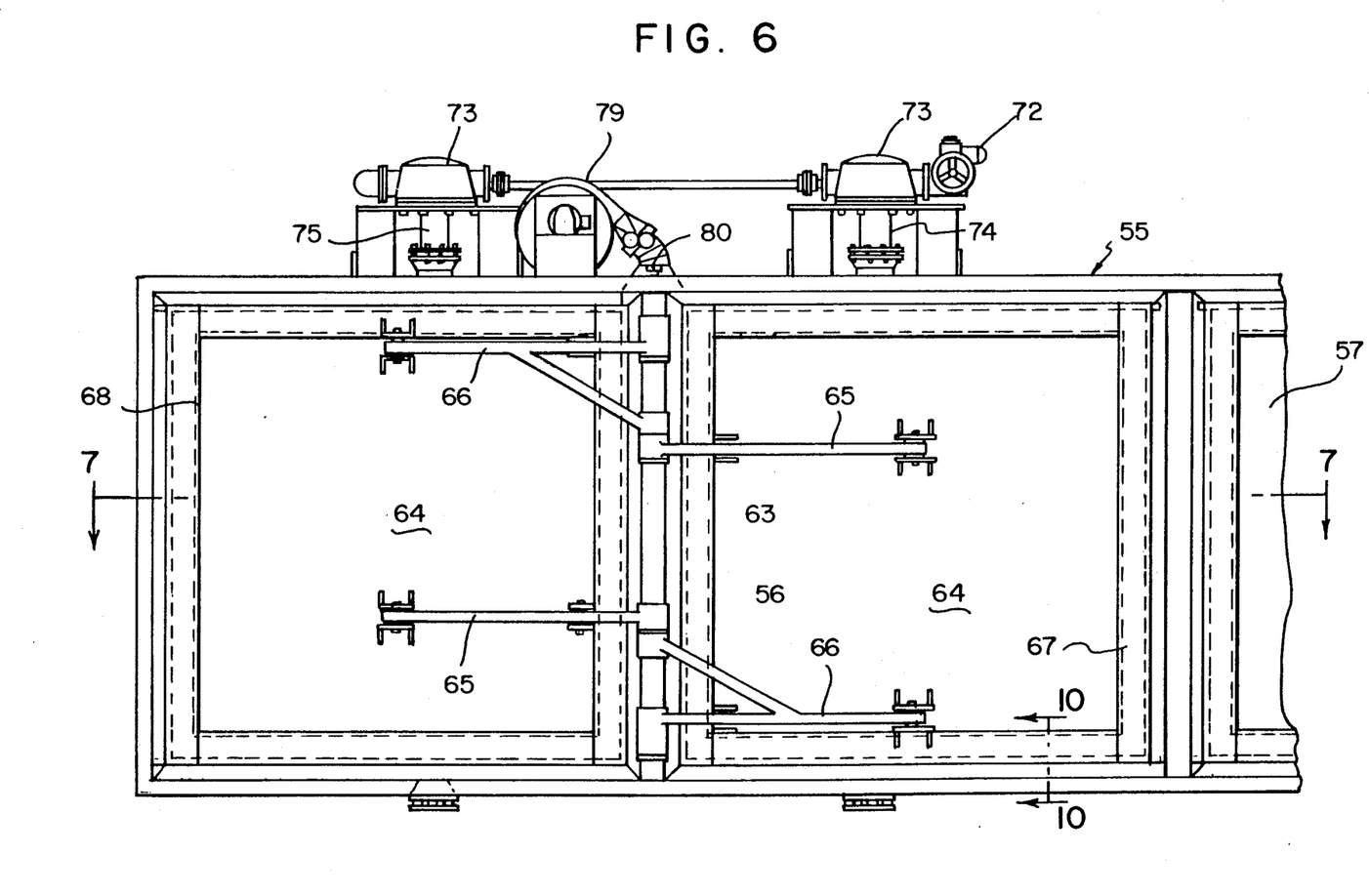
FIG. 6 is a view of a compound isolating valve in accordance with the invention, as seen from the downstream side thereof.
Figure 7:
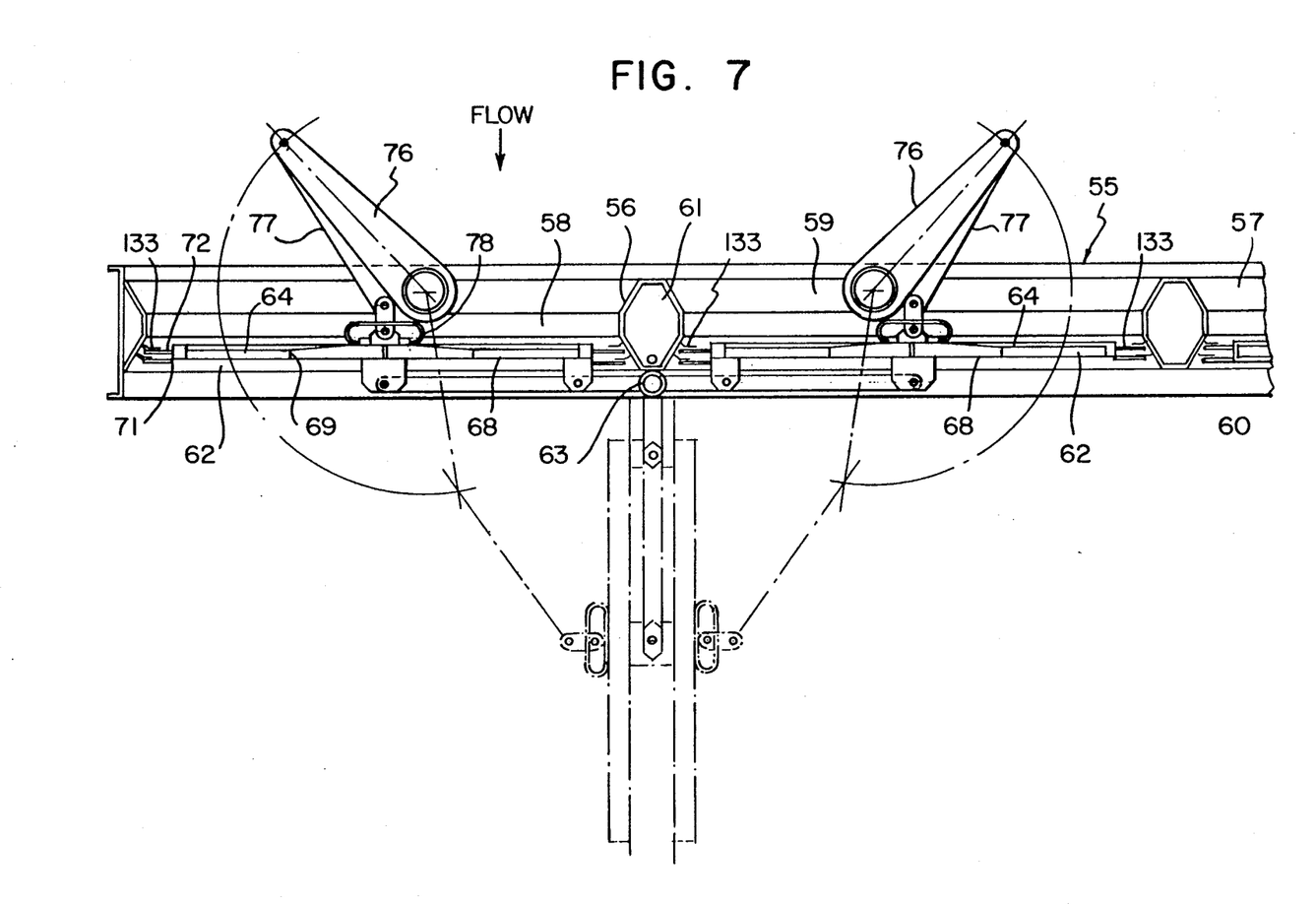
FIG. 7 is a section taken approximately along the indicated line 6—6 of FIG. 5.

The blades 64 are moved between their port closing and open positions by a reversible actuator 72 mounted on an outer surface of the frame 55 and connected through gear boxes 73 to torque tubes 74 and 75 in a manner turning them in opposite directions, the torque tubes are journalled in the frame 55 on the upstream side thereof and on the side of the transverse center line of the blades nearer to the partition 56 and each includes drive arms 76 pivotally connected to toggle links 77 which are pivotally connected to a thermal compensator 78 anchored to the upstream face of the associated blade 64. Such a drive serves to swing the blade quickly between port closing and open positions.

Figure 10:
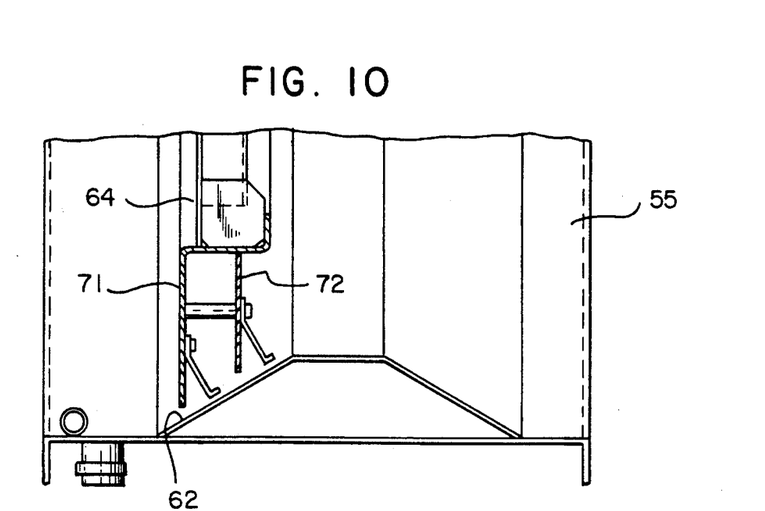
FIG. 10 is a fragmentary section taken transversely through the partition and the adjacent portion of an operatively positioned blade.

The isolating valve unit is shown as utilizing sealing air in addition to mechanical sealing. For that purpose, a fan 79 is mounted on the frame 55 with the sealing air delivered by a valve controlled conduit 80 discharging air into the top portions of the channels established by the blade tips 70 and 71 and their sealing units 133 and into the air chamber 61 of the partition 56 from which air is discharged through ports 81 into the proximate blade channels and into the chamber 61. It will be noted that the cross sectional shape of the partition 56 provides a central portion of substantial width with portions of the seats 62 on the down stream side thereof. When the blades 63 are in their wide open positions, the blades are effectively shielded by the partition 56 the shape of which prevents any troublesome turbulence.

Means for flushing the bottom sections of the seats 61 consist of a spray bar 81 extended lengthwise of each such section on their downstream sides with a drain 82 on the downstream side of each seat. The partition is also provided with a wash water pipe 83 which is to be connected to a water source if it is found desirable to wash the air chamber.

From the foregoing, it will be apparent that both diverter and isolating valves have sealing means of increased effectiveness due both to the linear contact of the seals with the seats and to the scraping action of the seals on transverse portions of the seats as blades swing into and out of their port closing positions. In addition, the components have in other embodiments proved both their effectiveness in use and their suitability for production.

I claim:

1. A valve for use in the control of a gas stream through a body having at least one port through which gas flow is to be permitted or prevented, a blade within the body, reversible means connected to the blade and to the body and operable to swing the blade between an operative position proximate to the port and a second position remote with respect thereto, said blade and port provided with a surrounding marginal sealing means interengageable when the blade is in said operative position then to effect the sealing of the port, one of said marginal sealing means having inwardly inclined surfaces and the other of said sealing means provided with first and second surrounding and resiliently flexible and spaced apart metallic seals which are in engagement with spaced apart, transverse zones of the inwardly inclined surfaces in said operative position, the first seal protruding beyond the edges of the second seal, the zone engaged by the second seal of a cross sectional area less than that engaged by the first seal, both seals in substantially linear contact with their respective zones in said operative position and in scraping engagement with the surfaces as the blade moves into and out of said position.

2. The valve of claim 1 in which the inwardly inclined surface constitutes a seat surrounding the port and the blade includes first and second, spaced apart tips to which to which the first and second resiliently flexible metallic seals, respectively, are attached.

3. The valve of claim 2 in which the body has an inlet port and a second port through which gas flow is to be permitted or prevented, the blade is operatively positioned with respect to the second port in the second position thereof, a second seat surrounds and is inclined inwardly towards the second port, the blade has a third surrounding tip, the first blade tip between and spaced from the first and third blade tips, a third seat sealing means is sealed to the third blade tip and a fourth seat sealing means is sealed to the first blade tip, the first and fourth sealing means on opposite sides of the first blade tip, the third and fourth seat sealing means each including a resiliently flexible metallic seal extending beyond the associated one of the blade tips and, in the second position of the blade, each is in sealing engagement with a different transverse zone of the second seat, the zone engaged by the seal of the third sealing means proximate to the second outlet port and the seal of the fourth sealing means remote therefrom, and the seals of both the third and fourth sealing means in scraping engagement with the second seat as the blade moves into and out of the second operative position.

4. The valve of claim 2 in which the first blade tip is dimensioned to protrude beyond the edges of the second blade tip and the first and second sealing means are identical.

5. The valve of claim 2 in which each of the sealing means includes at least the seat engaging seal and a wing, both the seal and the wing have inner and outer portions, the inner portions secured to the side of the appropriate one of the blade tips which is disposed towards the seat in the operative position of the blade, the outer portions angled away from said blade tip with an angular difference such that the seal is held tensioned by the wing unless in contact with the seat, and the wing is so dimensioned that the outer edge thereof is effective to scrape encrustments from the seat without contact therewith.

6. The valve of claim 2 and means to flush a selected portion of a seat to remove encrustments scraped therefrom by the associated sealing means.

7. The valve of claim 2 in which sealing air is to be employed to supplement the sealing of the port by the engagement of the seals with the seat and the dimensions of the blade tips and the seals of the sealing means provide a surrounding blade channel of substantial cross sectional area for the sealing air, and the body has a means to deliver sealing air into the channel when the blade is operatively positioned.

8. The valve of claim 3 in which the body has an inwardly opening channel between adjacent sides of the seats, a pivot is supported in the channel parallel to the adjacent sides, the first blade tip is connected to the pivot, the adjacent side of each seat has a port, and a source of sealing air has valve controlled conduits, one for each seat port and in communication therewith.

9. The valve of claim 2 in which the body is a frame having upstream and downstream sides when incorporated in a duct, a partition dividing the frame, the frame and partition establishing side by side ports and seats therefor, a pivot is supported by the frame on the downstream side thereof and behind the partition, means connecting each blade to the pivot in a manner enabling the blades to swing 90° between a port blocking position and a wide open position in which both blades are partly shielded by the partition.

10. The valve of claim 9 in which the partition is hollow and of a cross sectional size and shape to be operable to divide a gas stream without creating troublesome turbulence, the central section of the partition of maximum width and on the upstream side of the seats.

11. The valve of claim 10 in which sealing air is delivered into the partition and the partition has ports in the portions thereof which are parts of the seats.

12. The valve of claim 9 in which each blade has two arms on the downstream side thereof which are connected to the pivot, the two arms of each blade spaced relative to the two arms of the other blade to prevent contact between the arms of two blades when both blades are in their wide open positions.

* * * * *